United States Patent
Honrao et al.

(10) Patent No.: US 11,587,013 B2
(45) Date of Patent: Feb. 21, 2023

(54) DYNAMIC QUALITY METRICS FORECASTING AND MANAGEMENT

(71) Applicant: INTERNATIONAL BUSINESS MACHINES CORPORATION, Armonk, NY (US)

(72) Inventors: Vinayak P Honrao, Bangalore (IN); Alli K S, Bangalore (IN); Shirshendu Saha, West Bengal (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 16/832,064

(22) Filed: Mar. 27, 2020

(65) Prior Publication Data
US 2021/0304105 A1   Sep. 30, 2021

(51) Int. Cl.
G06Q 10/06       (2012.01)
G06F 40/18       (2020.01)
G06Q 10/0639     (2023.01)

(52) U.S. Cl.
CPC ....... *G06Q 10/06395* (2013.01); *G06F 40/18* (2020.01)

(58) Field of Classification Search
None
See application file for complete search history.

(56) References Cited

U.S. PATENT DOCUMENTS

| | | | |
|---|---|---|---|
| 8,032,236 B2 | 10/2011 | Stephenson et al. | |
| 8,504,405 B2 | 8/2013 | Miller et al. | |
| 10,977,307 B2 * | 4/2021 | Pereira | G06F 16/7837 |
| 2008/0082957 A1 * | 4/2008 | Pietschker | G06Q 10/10 |
| | | | 717/101 |

(Continued)

FOREIGN PATENT DOCUMENTS

| | | | | |
|---|---|---|---|---|
| CN | 110515851 A | * | 11/2019 | |
| WO | WO-2017106863 A1 | * | 6/2017 | G06F 11/36 |

OTHER PUBLICATIONS

Panetta, Karen, Arash Samani, and Sos Agaian. "A robust no-reference, no-parameter, transform domain image quality metric for evaluating the quality of color images." IEEE Access 6 (2018): 10979-10985. (Year: 2018).*

(Continued)

*Primary Examiner* — Thomas L Mansfield
(74) *Attorney, Agent, or Firm* — Scott Dobson; Andrew D. Wright; Calderon Safran & Cole, P.C

(57) ABSTRACT

Systems and methods for dynamic quality metrics forecasting and management are provided. In embodiments, a method includes receiving, by a computing device, parameter data from one or more data sources for selected parameters, wherein the parameters are associated with one or more processes; generating, by the computing device, output values for plural quality metrics based on the parameter data; identifying, by the computing device, relationships between the plural quality metrics based on changes in the received parameter data and output values for the plural (Continued)

quality metrics over time; receiving, by the computing device, user-selected values for the selected parameters; and generating, by the computing device, predicted output values for the quality metrics based on the identified relationships between the quality metrics and the user-selected values.

20 Claims, 8 Drawing Sheets

(56) References Cited

U.S. PATENT DOCUMENTS

| | | | |
|---|---|---|---|
| 2014/0207017 A1* | 7/2014 | Gilmore | A61B 5/389 600/546 |
| 2014/0244362 A1 | 8/2014 | Chaudhury | |
| 2015/0220420 A1 | 8/2015 | Boneti et al. | |
| 2016/0232003 A1* | 8/2016 | Kompella | G06F 8/77 |
| 2017/0235569 A1* | 8/2017 | Sturtevant | G06Q 10/06393 717/102 |

OTHER PUBLICATIONS

Sunter, Stephen, and Naveena Nagi. "Test metrics for analog parametric faults." Proceedings 17th IEEE VLSI Test Symposium (Cat. No. PR00146). IEEE, 1999. (Year: 1999).*

Costa, Ana Rita, et al. "Six sigma: Main metrics and r based software for training purposes and practical industrial quality control." Quality Innovation Prosperity 23.2 (2019): 83-100. (Year: 2019).*

Mell et al., "The NIST Definition of Cloud Computing", NIST, Special Publication 800-145, Sep. 2011, 7 pages.

* cited by examiner

DYNAMIC QUALITY METRICS FORECASTING AND MANAGEMENT

BACKGROUND

Aspects of the present invention relate generally to quality management for processes and, more particularly, to dynamic quality metrics forecasting and management.

Organizations often desire to monitor processes, their performance and their evaluation. Organizations may manage their performance by tracking and measuring performance across dimensions. Performance may be measured in terms of effectiveness in achieving goals by meeting targets associated with some objective(s) associated with the target. Performance or quality metrics and values associated with targets may be calculated. Various metrics and performance values are impacted by changes in influencing factors, assumptions, decisions or other impact parameters. An organization may monitor different phases of particular projects.

One type of organizational monitoring is the monitoring of a software development life cycle. A software development life cycle has different distinct development phases. Quality metrics that may be monitored during a software development life cycle can include phase containment, defect removal efficiency, defect density and turn-around time, for example.

SUMMARY

In a first aspect of the invention, there is a computer-implemented method including receiving, by a computing device, parameter data from one or more data sources for selected parameters, wherein the parameters are associated with one or more processes; generating, by the computing device, output values for plural quality metrics based on the parameter data; identifying, by the computing device, relationships between the plural quality metrics based on changes in the received parameter data and output values for the plural quality metrics over time; receiving, by the computing device, user-selected values for the selected parameters; and generating, by the computing device, predicted output values for the quality metrics based on the identified relationships between the quality metrics and the user-selected values.

In another aspect of the invention, there is a computer program product including one or more computer readable storage media and program instructions collectively stored on the one or more computer readable storage media. The program instructions are executable by a computing device to cause the computing device to: determine a subset of parameters for a user selected from a plurality of parameters, wherein the parameters are associated with one or more processes; receive parameter data from one or more data sources based on the subset of parameters; generate output values for plural quality metrics based on the parameter data; identify relationships between the plural quality metrics based on changes in the received parameter data and output values for the plural quality metrics over time; receive user-selected values for the subset of parameters; and predict output values for the plural quality metrics based on historic parameter data from a deep neural network with dynamic bias controlled by impact factors for the quality metrics based on the identified relationships between the quality metrics and the user-selected values.

In another aspect of the invention, there is system including a processor, a computer readable memory, one or more computer readable storage media, and program instructions collectively stored on the one or more computer readable storage media. The program are instructions executable to: store a subset of parameters of a plurality of parameters selected by a user, wherein the parameters are associated with one or more processes; receive parameter data from one or more data sources based on the subset of parameters; generate output values for plural quality metrics based on the parameter data; identify relationships between the plural quality metrics based on changes in the received parameter data and output values for the plural quality metrics over time; receive user-selected values for the subset of parameters; and predict output values for the plural quality metrics based on historic parameter data from a deep neural network with dynamic bias controlled by impact factors for the quality metrics based on the identified relationships between the quality metrics and the user-selected values.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
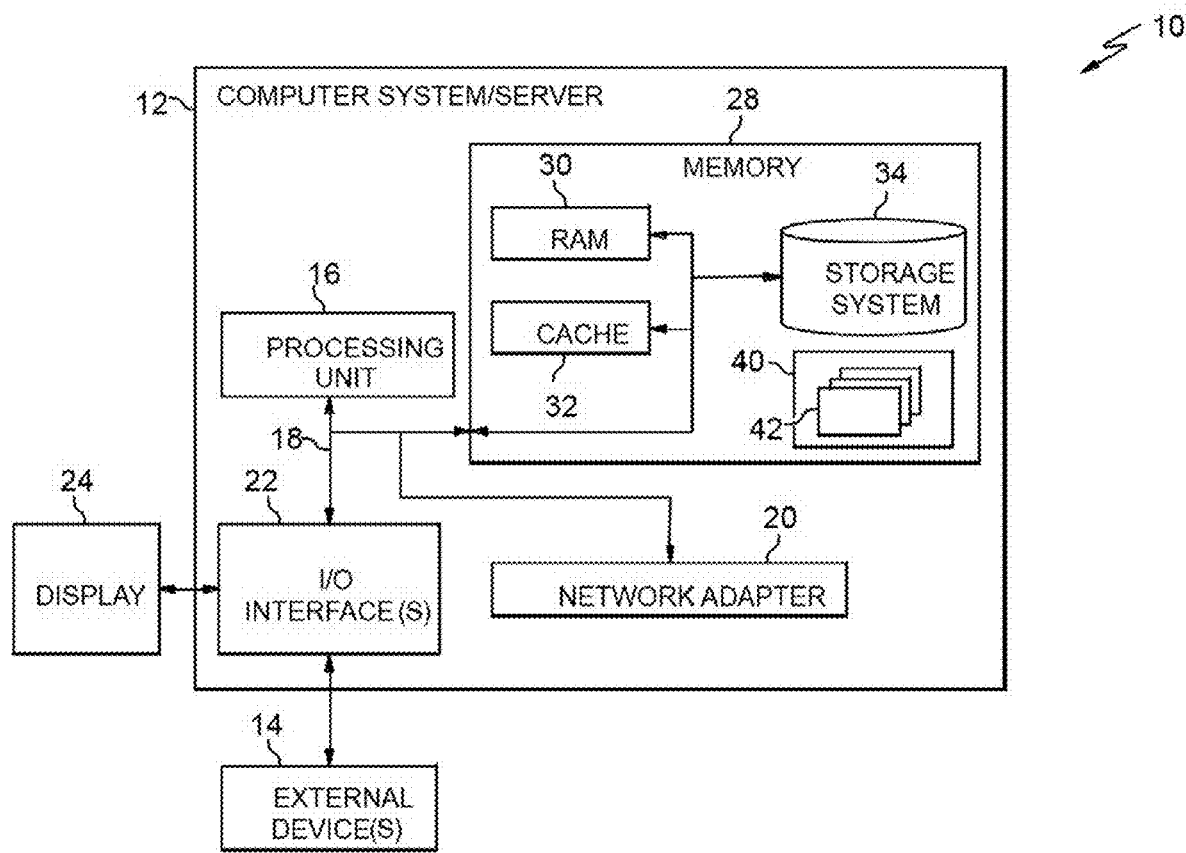
FIG. 1 depicts a cloud computing node according to an embodiment of the present invention.

Aspects of the present invention relate generally to quality management for processes and, more particularly, to dynamic quality metrics forecasting and management. In embodiments, a system and method for dynamically capturing quality input parameters for organizational metrics utilizes optimized ranges of parameters which are directly or inversely proportional to other metrics. In implementations, a system enables a user to select input parameters (e.g., hours associated with a phase, first severity of defects, second severity of defects, etc.) to customize business rules (e.g., quality metrics filters); generate quality metric values (e.g., values for average closure rates, re-testing times, etc.) based on incoming parameter data and the business rules; determine compliance or non-compliance of the quality metrics values with expected quality metrics values; determine relationships between multiple quality metrics; and generate predicted or forecasted quality metrics values based on the determined relationships and stored rules.

Organizations often desire to monitor processes and their performance using monitoring systems. The relationships between different types of performance metrics (e.g., phase containment percentage/defect removal efficiency, defect density, turnaround time, etc.) and dependencies on input parameters increase complexities in such monitoring systems. In embodiments, a system and method utilizes an optimization algorithm for finding a range for a set of input parameters which are directly or inversely proportional to different metrics. In implementations, mathematical terminologies are utilized to express a way to find optimized values for a proactive quality management system. In aspect, a system utilizes the step by step algorithm of reverse computation of ranges of optimized values over a set of predicted values of organization-specific impacting parameters (impact factors) and metrics, and suggests a meaningful and balanced set of input parameters for a future time with optimum quality metrics.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
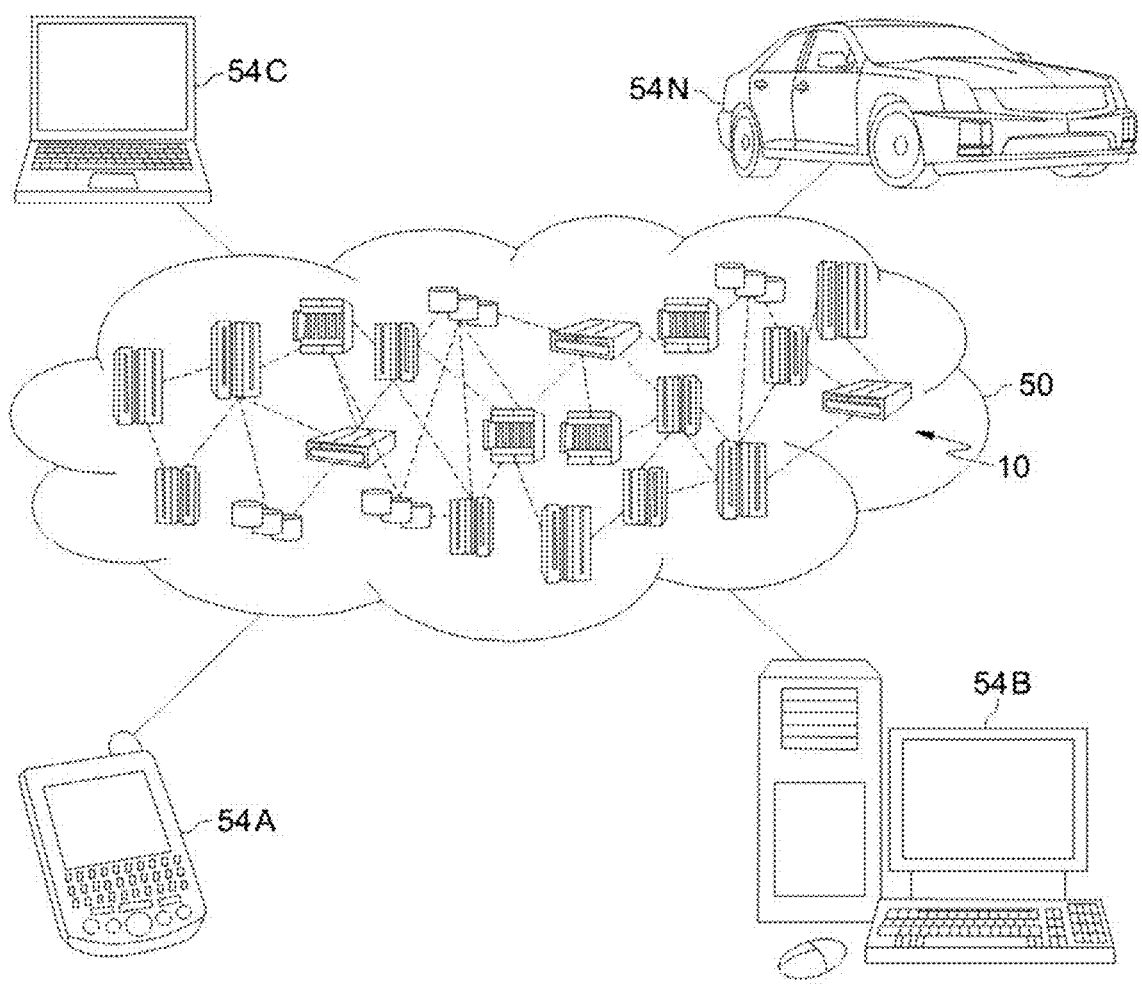
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
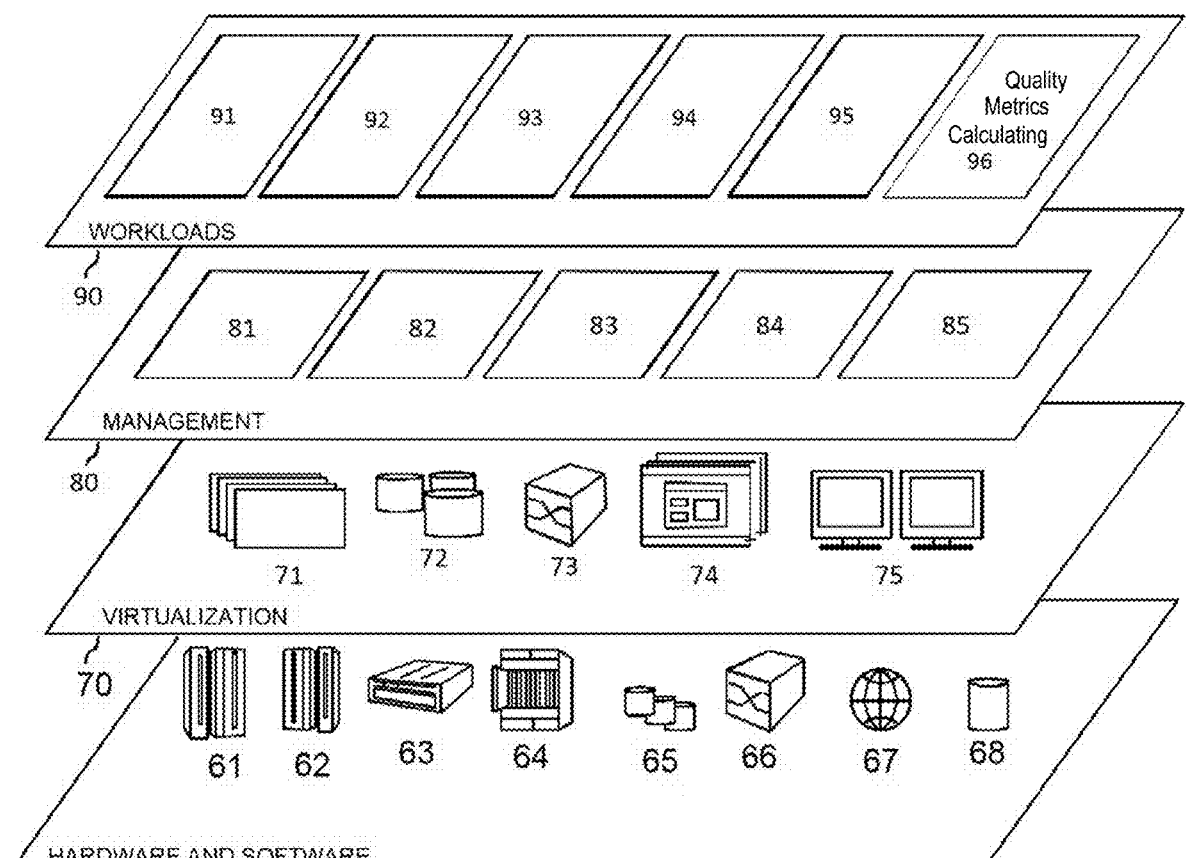
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and quality metrics calculating 96.

Implementations of the invention may include a computer system/server 12 of FIG. 1 in which one or more of the program modules 42 are configured to perform (or cause the computer system/server 12 to perform) one of more functions of the quality metrics calculating 96 of FIG. 3. For example, the one or more of the program modules 42 may be configured to: generate values for quality metrics based on parameter data (input parameter and hidden parameter data); determine compliant and non-compliant quality metrics by comparing generated quality metrics values with expected quality metrics values; display quality metrics values and compliance indicia to a user; determine relationships between multiple quality metrics; receive user-selected parameter values (input parameter values and/or hidden parameter values); and generate predicted quality metrics values (forecasted values) based on the user-selected parameter values and determined relationships.

Figure 4:
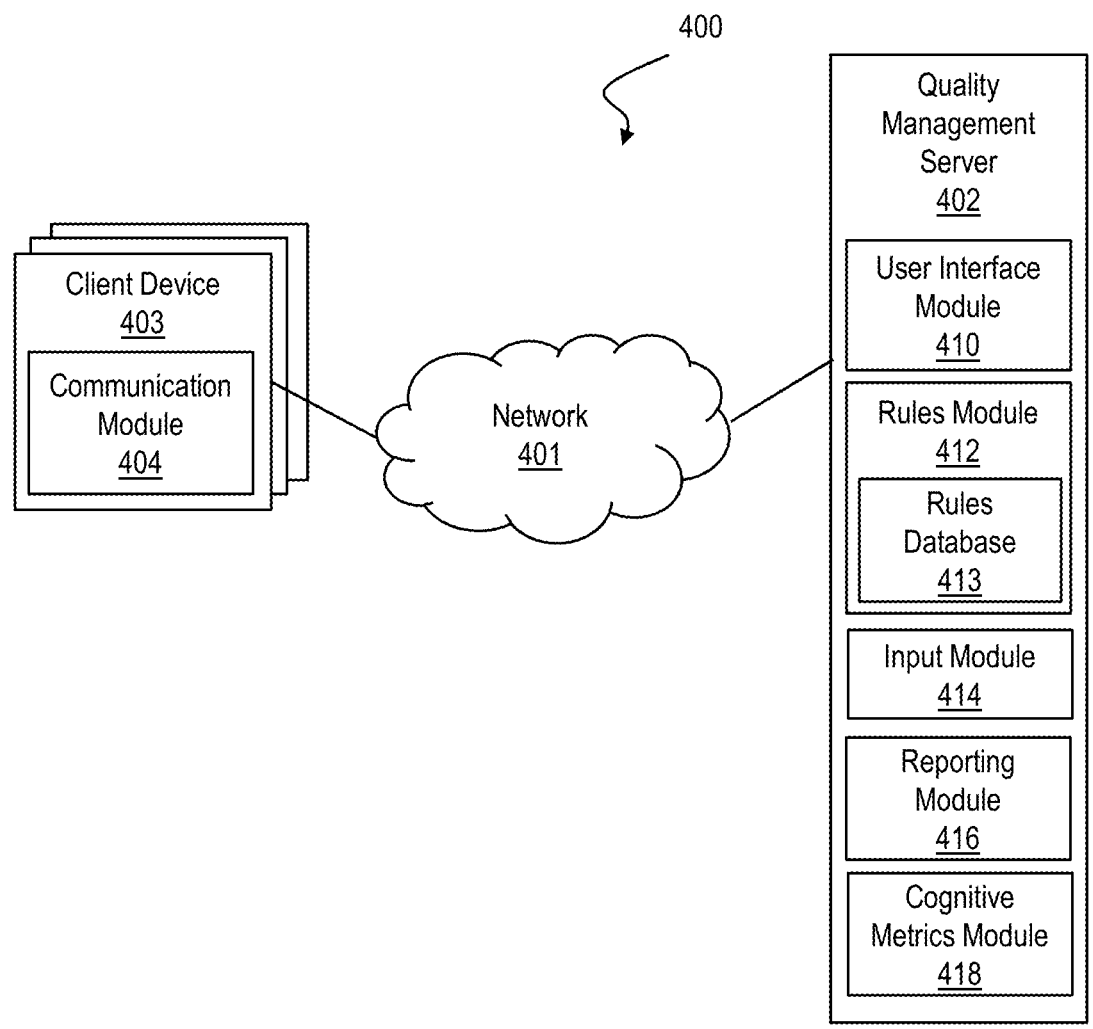
FIG. 4 shows a block diagram of an exemplary environment in accordance with aspects of the invention.

FIG. 4 shows a block diagram of a quality management environment 400 in accordance with aspects of the invention. In embodiments, the quality management environment 400 includes a network 401 connecting a quality management server 402 (hereafter server 402) with a plurality of client devices represented at 403. The client devices 403 may include components of the computer system 12 of FIG. 1, and may be a server, desktop computer, laptop computer, tablet, smartphone, or other personal computing device. The quality management server 404 may also include components of the computer system 12 of FIG. 1, and may comprise a special purpose computing device configured to determine actual and forecasted quality metrics values customized for a user.

The network 401 may be any suitable communication network or combination of networks, such as a local area network (LAN), a general wide area network (WAN), and/or a public network (e.g., the Internet). The quality management server 404 and the client devices 403 may comprise nodes 10 in the cloud computing environment 50 of FIG. 2. In implementations, quality metrics management and forecasting is provided as a cloud service to one or more clients via the network 401.

Still referring to FIG. 4, the server 402 may include one or more program modules (e.g., program module 42 of FIG. 1) executed by the server 402 and configured to perform one or more functions described herein. In embodiments, the server 402 includes one or more of the following: a user interface module 410, a rules module 412, a rules database 413, an input module 414, a reporting module 416 and a cognitive metrics module 418.

In implementations, the user interface module 410 is configured to provide a user with access to selectable options to set business rules (e.g., quality metrics filters) in order to generate customized quality metrics data. In aspects, the user interface module 410 enables a user of a client device 403 to send and receive data via a communication module 404 of the client device 403.

In embodiments, the rules module 412 is configured to receive and store business rules data for a user to define quality metrics based on a user's business requirements. In aspects, business rules are stored in the rules database 413 by the rules module 412.

In aspects, the input module 414 is configured to identify parameters (input parameters and/or hidden parameters) to be utilized in the generation of quality metrics based on the stored business rules, and identify sources (data sources) of parameter data. In implementations, the input module 414 is configured to receive parameter data from the identified data sources for use in generating quality metrics values/outputs.

In embodiments, the reporting module 416 is configured to generate and output data to the user regarding actual quality metrics values and/or forecasted quality metrics values. In implementations, the reporting module 416 provides quality compliance information to the user (e.g., via the client device 403 of the user). In aspects, the reporting module 416 is configured to determine output parameters for a user based the stored business rules.

In implementations, the cognitive metrics module 418 is configured to map parameters (input parameters, hidden parameters and output parameters) to associated data sources; generate values for quality metrics based on received parameter data; determine compliant or non-compliant quality metrics values by comparing generated quality metrics values with expected quality metrics values; display quality metrics values and compliance indicia to a user; determine relationships between multiple quality metrics; receive user-selected parameter values for quality metrics forecasting; and generate predicted quality metrics values (forecasted quality metrics values) based on the user-selected parameter values and determined relationships.

In embodiments, the server 402 may include additional or fewer components than those shown in FIG. 4. In embodiments, separate components may be integrated into a single computing component or module. Additionally, or alternatively, a single component may be implemented as multiple computing components or modules. Additionally, the quantity of devices and/or networks in the quality management environment 400 is not limited to what is shown in FIG. 4. In practice, the quality management environment 400 may include additional devices and/or networks; fewer devices and/or networks; different devices and/or networks; or differently arranged devices and/or networks than illustrated in FIG. 4. Devices of the quality management environment 400 may interconnect via wired connections, wireless connections, or a combination of wired and wireless connections.

Figure 5:
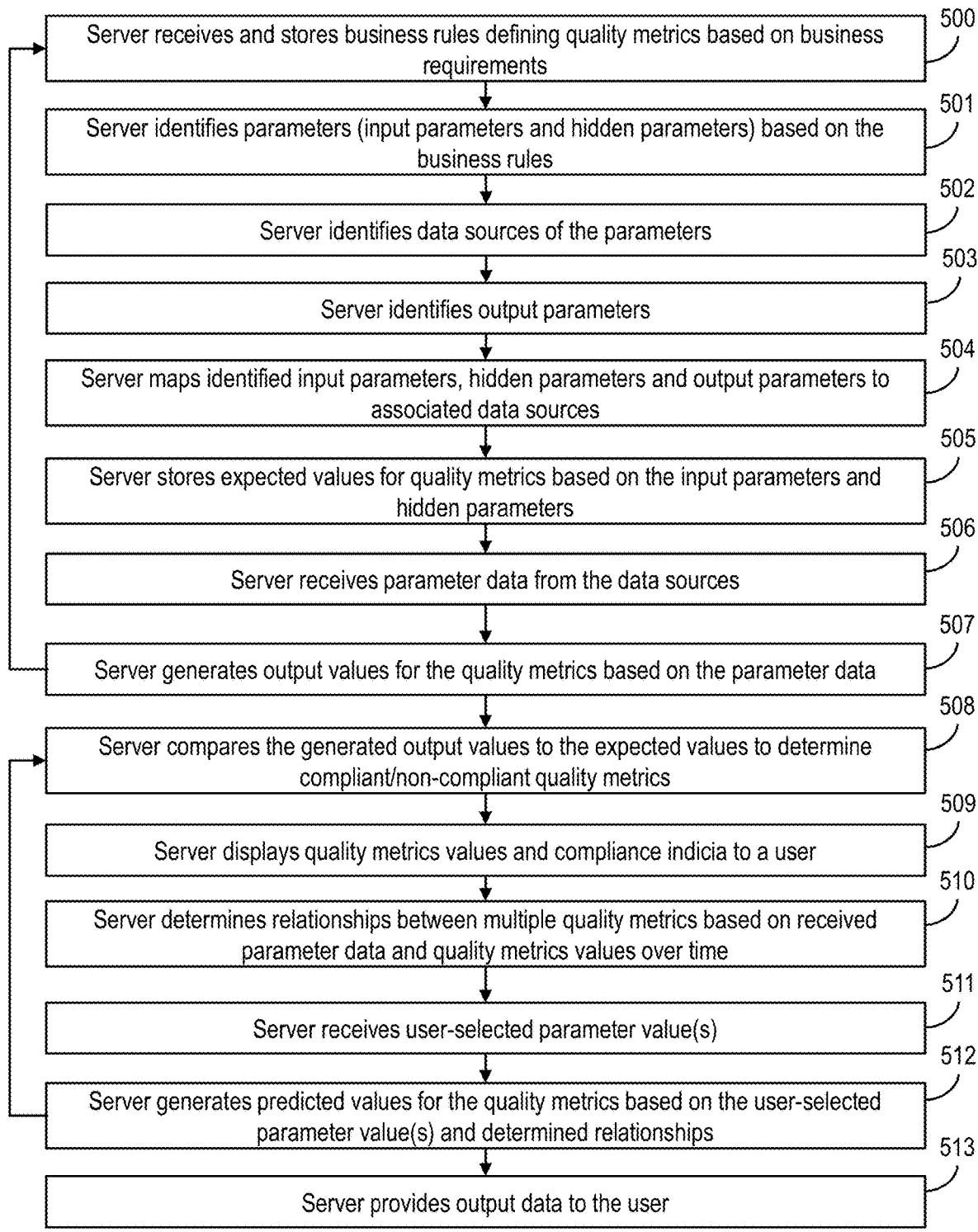
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the server 402 stores business rules for at least one organization, wherein the business rules define quality metrics to be monitored by the server 402 based on organization-specific, project-specific, and/or phase-specific requirements. In implementations, the server 402 stores business rules associated with three main metrics: (a) phase containment percentage/defect removal efficiency (PC); (b) defect density (DD); and (c) turn-around time (TAT) of a software development life cycle.

In embodiments, the server 402 provides a user interface via the user interface module 410, which enables users to select a subset of parameters (e.g., input parameters and/or hidden parameters) from a list of possible parameters, to be stored as business rules and utilized in the generation of quality metrics. The term parameter as used herein refers to influencing factors, assumptions, decisions or other parameters that impact quality metrics calculations. The term quality metrics as used herein refers to performance measures for products and/or processes. In aspects, the business rules are utilized as quality metrics filters to generate customized quality metrics based thereon. In embodiments, the rules module 412 of the server 402 receives user selected filter settings (e.g., selected parameters) and saves them in the rules database 413. The filter settings may be saved by organization, project, and/or project phase in the rules database 413. In aspects, the server 402 enables a user to select accepted or considered values of parameters for storage by the server 402. By way of example, the server 402 may provide a user with the following selectable parameters: (1) Test Phase>>PHASE>>Unit Testing, Integrated Systems Testing, System Testing, Post-production Verification Testing, User Acceptance Testing; (2) Descriptive Phase or Sub-phase>>SUB_PHASE>>Regression Testing, Component Testing, Performance Testing, Load Testing; (3) Status>>STATUS>>Open, Not a Defect, Fix in progress, Retest, Closed; (4) Severity>>SEVERITY>>High, Medium, Low; (5) Defect Category>>CATEGORY>>Defect, Requirement, Enhancement.

With continued reference to step 500, different organizations, projects or project stages may have different monitoring requirements, and thus different quality metrics associated with those monitoring requirements may need to be calculated. In implementations, the server 402 is configured to receive a user's selection of one or more parameters from a list of parameters and provide column names for one or more associated main metrics and/or sub-metrics in a graphical user interface. Different quality metrics (including any sub-metrics) may be calculated by the server 402 at step 507 (discussed below) based on the business rules.

At step 501 the server 402 identifies parameters (e.g., input parameters and/or hidden parameters) associated with the stored business rules of step 500. The term input parameters as used herein refers to inputs to the server 402 that deliver values to functions (quality metrics functions). In aspects, input parameters are defined as name/value pairs. Some examples of input parameters that may be associated with one or more quality metrics to be calculated include: Release-Deployment; Projects & Programs Mappings; Test Phase; Test SubPhase; Defect Details; Defect Status; Defect Severity & Blocker Priority; Defect Date Details; and Root Cause Category. The term hidden parameters refers to different parameters (nodes) at different layers or levels, wherein the different parameters result in the generation of different permutations and combinations of main quality metrics and sub-metrics. In aspects, each layer of nodes trains on a distinct set of features based on the previous layer's output in Deep Learning Network processing of the invention. In implementations of step 501, the server 402 considers multiple organization-specific impact parameters or factors (e.g., from stored business rules), such as: Teams & Systems subject matter experts (SMEs); Improvement Action Plans; Past, Present Future Work/Estimation; Contract level Changes; Business Priorities; Market Trends; and Client Initiatives. In embodiments, the input module 414 of the server 402 implements step 501 and stores the identified parameters.

At step 502, the server 402 identifies sources (data sources) of the parameters (e.g., input parameters and hidden parameters) of step 501. The following are examples of data sources from which parameter data can be obtained by the server 402: defects for pre-production tracking tool; defects for post-production tracking tool; project list—central project and program management tool; relationship/association between project program system and metrics; system impacts: code and test; estimation in hours for each system for different phases; employee list with their organization; and organization specific deliverable details. In embodiments, the server 402 also determines types of data sources at step 502, such as a type of spreadsheet, comma-separated values file (csv), Oracle™, server credentials, connection details, and path/folder. In embodiments, the input module 414 of the server 402 implements step 502.

At step 503, the server 402 identifies output parameters (e.g., outputting or reporting requirements) for an organization, project or project phase based on the stored business rules. For example, output parameters that may be shared with a user through outputting or reporting tools include: scheduled deployments (e.g., daily, weekly, monthly, bi-month, quarterly, half yearly, annually, etc.); metrics (e.g., individual metrics, all metrics, category-wise metrics such as organization-specific metrics, or combinations thereof); and system-wise predictions, charts and/or trends (e.g., individual systems applications, domain-wise system cluster, all systems, etc.). In embodiments, the reporting module 416 of the server 402 implements step 503.

At step 504, the server 402 maps identified parameters (e.g., input parameters, hidden parameters, and output parameters) to associated data sources (e.g., columns/fields of identified data sources) and saves the mapping data. In embodiments, the cognitive metrics module 418 of the server 402 implements step 504.

At step 505, the server 402 stores expected values for quality metrics and/or sub-metrics based on the selected parameters (e.g., input parameters and hidden parameters) in the stored business rules. In implementations, the server 402 stores default values associated with the identified parameters in the business rules. In aspects, the server 402 receives user selected values for the quality metrics and/or sub-metrics. In embodiments, the server 402 stores expected values for three main metrics (PC, TAT and DD) and more than fifty sub-metrics based on multiple dynamic parameter selection. In embodiments, the rules module 412 of the server 402 implements step 505.

At step 506, the server 402 receives parameter data (e.g., input parameter data and hidden parameter data) from the data sources. In embodiments the data sources are local sources, remote sources, or a combination of local and remote sources. Step 506 can be performed on a continuous or periodic basis. For example, the parameter data may be updated daily, and may include data regarding daily progress including net new defects for a project. In implementations, the sever 402 obtains or retrieves the appropriate parameter data for a particular user from one or more data sources based on the mapping of step 504. In embodiments, the input module 414 of the server 402 receives and stores the input parameter data and hidden parameter data.

At step 507, the server 402 generates output values (e.g., actual values) for the quality metrics and/or sub-metrics based on the parameter data received at step 506. In aspects, the server 402 provides easily reconfigurable business rules according to step 500 and enables step 507 to be selectively repeated to generate different quality metrics values based on different business rules (e.g., different parameters). In implementations, steps 506 and 507 are repeated periodically or continuously to generate real-time or near-real-time output values for plurality quality metrics based on incoming parameter data. In embodiments, the cognitive metrics module 418 of the server 402 implements step 507.

At step 508, the server 402 compares the actual values determined at step 507 with the expected values (e.g., threshold values) stored at step 505 to determine compliant or non-compliant metrics. In other words, server 402 determines whether each quality metric value or sub-metric value to be determined for an organization, project or phase meets expectations (e.g., passes) or does not meet expectations (e.g., fails). In embodiments, the cognitive metrics module 418 of the server 402 implements step 508.

At step 509, the server 402 generates and displays quality metrics compliance indicia for a user. In embodiments, the compliance indicia indicates that quality metrics and/or sub-metrics meet expectations (e.g., pass) or do not meet expectations (e.g., fail). In implementations, the compliance indicia are in the form of color coded displays showing compliant quality metrics in a first color (e.g., green) and non-compliant quality metrics in a second color (e.g., red). Compliance indicia may indicate compliance of an organization, project or phase of a project with expected quality metrics (e.g., green indicates a project meets expectations for 90% of all quality metrics) based on stored rules (e.g., threshold values), or compliance indicia may indicate whether each quality metric individually meets expectations. In embodiments, compliance indicia comprise two or more colors, however without loss of plurality it can be represented with multi-level compliance indicia which will have threshold values between them.

In embodiments, different graphic user interface displays may be selected by a user to show different levels of compliance with expected values. In one example, the server 402 provides an option to view a display showing compliance of one or more projects as a whole with expected quality metrics goals, and also provides an option to view a display showing compliance of each quality metric of respective projects with expected quality metrics goals. In embodiments, the cognitive metrics module 418 of the server 402 implements step 509 (e.g., through the user interface module 410). In one example, the communication module 404 of the client device 403 enables the display of quality metrics data from the server 402 based on stored rules in the rules database 413 for a particular organization, project and/or project phase.

At step 510, the server 402 determines and stores relationships between the quality metrics at issue based on received parameter data. In aspects, the server 402 determines relationships between changes in each parameter across multiple quality metrics. For example, the server 402 may determine over time, based on changes in parameters, relationships between the parameters and different quality metrics, wherein a change in the value of one parameter may cause a predictable change in one or more quality metrics outputs. In embodiments, the cognitive metrics module 418 of the server 402 implements step 510.

In implementations, the cognitive metrics module 418 utilizes deep learning neural network processes to determine relationships. The term deep learning as used herein refers to machine learning methods based on artificial neural networks with representational learning. Learning can be supervised, semi-supervised or unsupervised. The term deep learning neural network as used herein refers to a neural network with a certain level of complexity (a neural network with more than two layers). Deep neural networks use sophisticated mathematical modelling to process data in complex ways. In embodiments, the server 402 prepares atomic mutually exclusive sets of quality failure events based on the stored business rules (filters/conditions of the organization). The term quality failure event as used herein refers to a defect or problem that has occurred which is raised by a ticket or a record in a software life cycle. The term atomic set as used herein refers to a smallest possible set of defects. The term mutually exclusive set as used herein refers to two defect sets that do not share common defects between them. Any change in these sets of events will either increase or decrease the quality metrics individually. On the other hand, a change in sets of events can impact in increment in a quality metric and decrement in another quality metric. For example, a change in a set of defects Integrated System Test(IST) phase is directly proportional to phase containment when k=IST, but is inversely proportional to Turn Around Time or Phase Containment with k=User Acceptance Test (UAT). In aspects, these actions are discretized in a small range of increment/decrement of impacting parameters, in the form of atomic sets.

Still referring to step 510, in embodiments the server 402 generates a matrix of cells including mutually exclusive atomic sets of failure events contributing to certain metrics versus actions associated with the mutually exclusive atomic sets of failure events, and assigns values to each cell based on one or more factors. In embodiments, the server 402 sets a booster factor for each action-to-state in a matrix, wherein the booster factor is a number representing how much the action is impacting a specific quality metric. In aspects, the server 402 also sets weight coefficients for the booster factors. A weight coefficient of a booster factor depends on how close the booster factor is to organization set limits. If the action does not contribute to any change to the quality metric, as per set rules of the organization, the weight coefficient is zero. In aspects, the server 402 applies Maxi-Max optimization to optimize one such action-booster matrix. MaxiMax determines the best that could happen under each action and then chooses the action with the largest value. That is, a MaxiMax strategy seeks out where the greatest benefit can be found. A maximum of all optimized values can be used by the server 402 to get a suggested output set of limits for quality failure events for each parameter for a foresighted best practice and proactive management for improved quality.

At step 511, the server 402 receives one or more user-selected parameter values (e.g., input parameter and/or hidden parameter values) for metrics forecasting. In implementations, user-selectable options or controls are provided to enable a user to adjust (increase or decrease) parameter values from the actual parameter values in order to obtain predicted quality metrics values across multiple parameters and multiple quality metrics. For example, the server 402 may provide an option to increase or decrease a parameter value for system test defects to determine the predicted effect on average turnaround time and end-to-end containment percentage metrics. In embodiments, the cognitive metrics module 418 of the server 402 implements step 511.

At step 512, the server 402 generates predicted values (e.g., forecasts) for the quality metrics based on the user-selected parameter values of step 511 and the determined relationships of step 510. In embodiments, the cognitive metrics module 418 of the server 402 implements step 512.

At step 513, the server 402 provides output data to the user. In aspects, output data is in the form of a graphical user interface display showing quality metrics forecasts (e.g., predicted quality metrics outputs) to the user (e.g., via the client device 403). In one example, the display depicts quality metrics compliance indicia for predicted metrics outputs to the user according to step 509. In embodiments, the reporting module 416 of the server 402 implements step 513.

Figure 6:
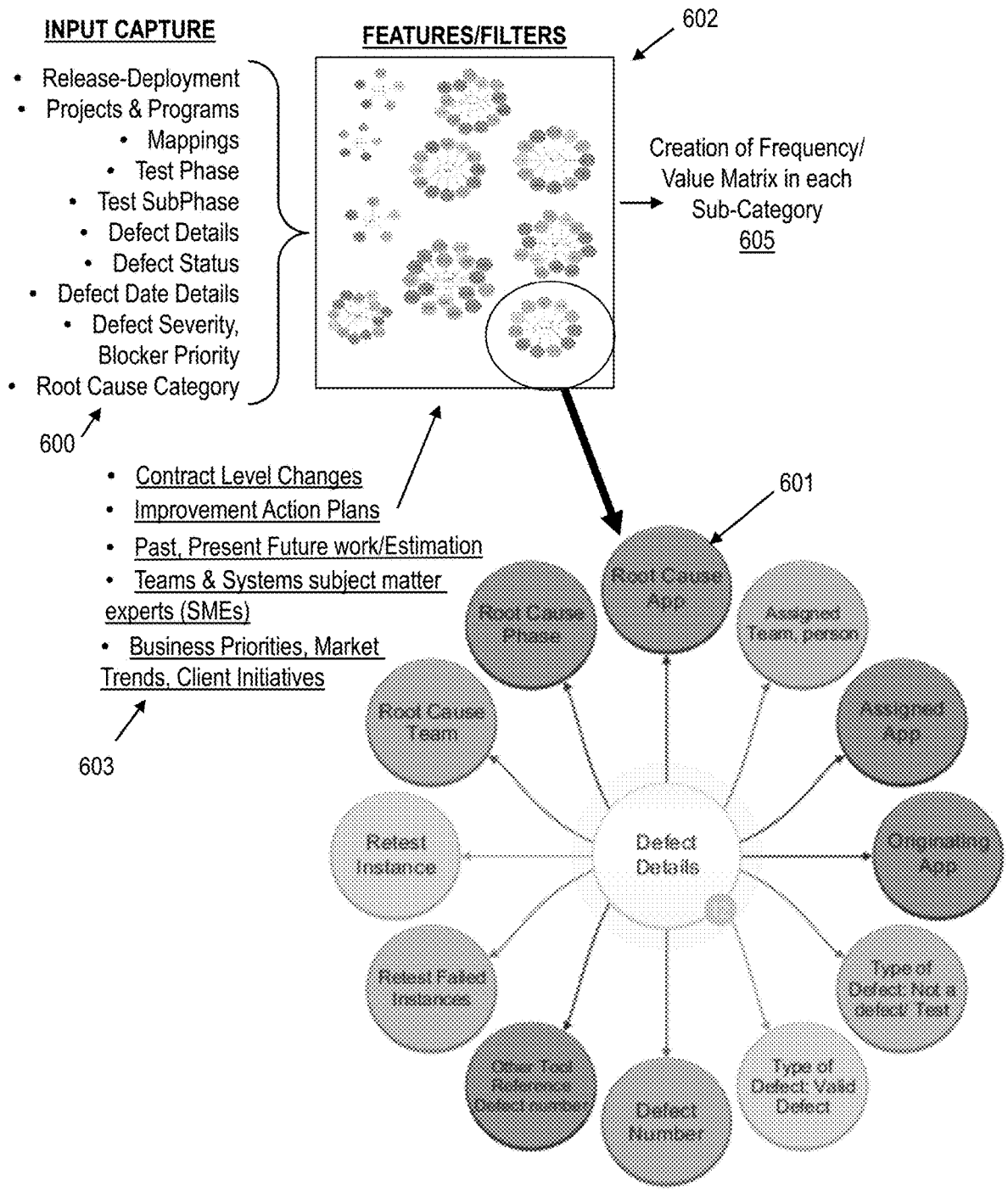
FIG. 6 shows an input processing diagram in accordance with aspects of the invention.

FIG. 6 shows an input processing diagram in accordance with aspects of the invention. Input processing of FIG. 6 may be implemented in accordance with method steps of FIG. 5.

As depicted in FIG. 6, input data for a variety of selected input parameters 600 and/or hidden parameters 601 is captured by the server 402, and processed at 602 based on stored business rules (e.g., quality metrics filters). In the example of FIG. 6, a number of business considerations 603 are utilized by the server 402 to generate the stored business rules. The server 402 obtains data for each selected input parameter (sub-category) and associated hidden parameters. As an example, the server 402 processes input data associated with the defect details parameter according to the stored business rules, wherein a variety of hidden layers or hidden parameters (e.g., root cause app) generally indicated at 601 are associated with the defect details parameter. At 605, the server 402 creates a frequency/value matrix for each input parameter (i.e., sub-category). The server 402 applies weights and dynamic bias values using time series input (historic input) of multiple impacting factors (independent variates) to generate quality metrics outputs.

Figure 7A:
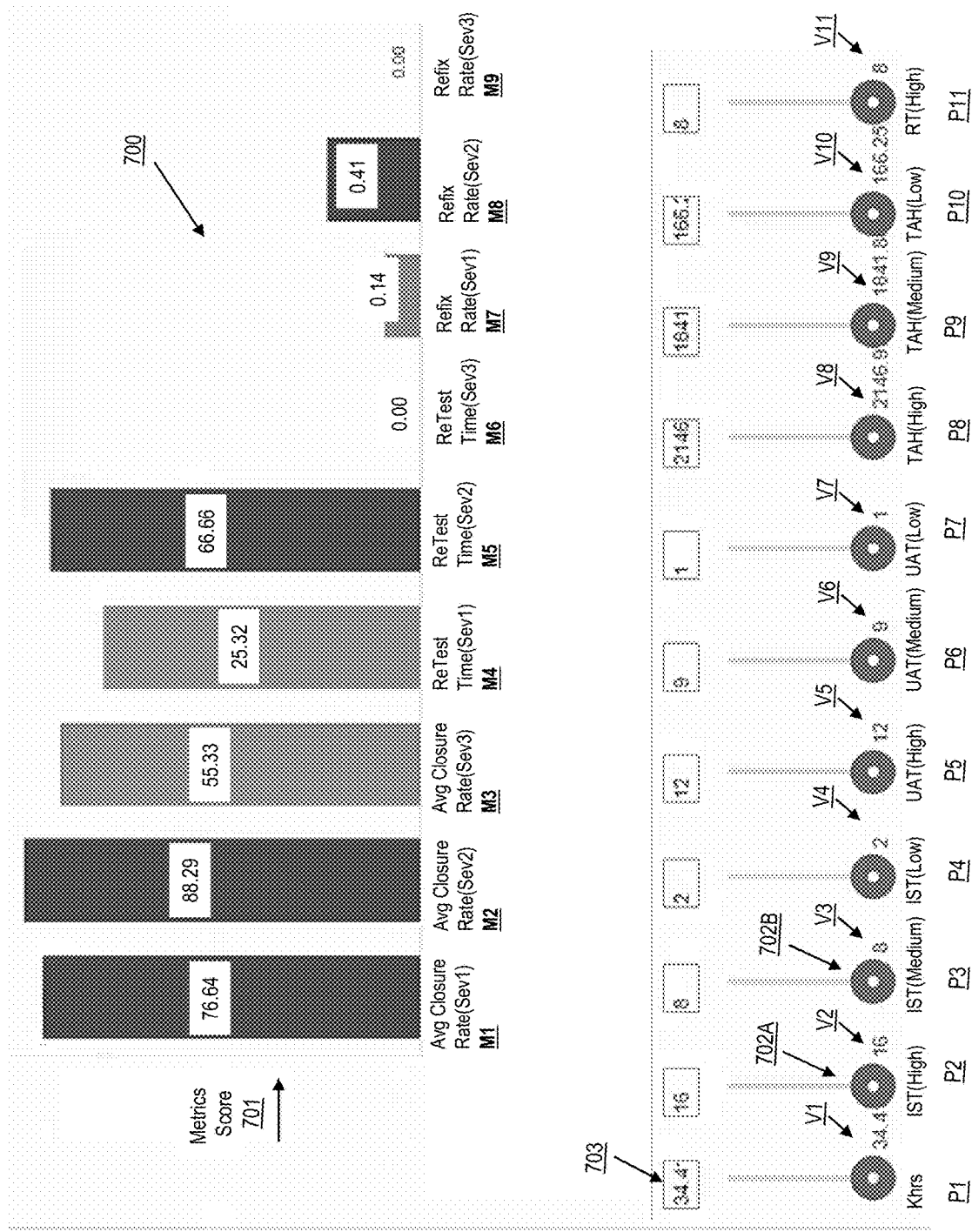
FIG. 7A depicts a quality metrics interface showing actual metrics in accordance with aspects of the invention.

FIG. 7A depicts a quality metrics interface 700 showing actual metrics in accordance with aspects of the invention. The user interface 700 may be utilized in the environment of FIG. 4 and in accordance with method steps of FIG. 5.

In the embodiment shown, the user interface 700 provides a graphical display of actual metrics scores (output values) for a plurality of metrics M1-M9. The quality metrics depicted include average closure rate at a first severity of defects (High), average closure rate at a second severity of defects (Medium), average closure rate at a third severity of defects (Low), retest time at High, retest time at Medium, retest time at Low, refix rate at High, refix rate at Medium and refix rate at Low. The quality metrics shown are for exemplary purposes, and the invention is not intended to be limited to the quality metrics shown. A graphical representation 701 of the metrics scores are also depicted. In embodiments, the graphical representation 701 includes indicia alerting a user to a status (e.g., compliant or non-compliant) of the quality metric. In the embodiment show, the graphical representation 701 is in the form of a bar graph, wherein metrics that fall within a predetermined acceptable numeric range are depicted in a first color (e.g., green) and metrics that fall outside the predetermined acceptable numeric range are depicted in a second color (e.g., red). In the example of FIG. 6A, metrics M1, M2, M5 and M8 have scores that fall outside the predetermined acceptable numeric range, metrics M3, M4 and M7 have scores that fall within the predetermined acceptable numeric range, and metrics M6 and M9 have scores of 0.00.

The user interface 700 further provides interactive controls 702 (e.g., 702A, 702B) enabling a user to selectively adjust a numeric value of one or more input parameters P1-P11. In the example of FIG. 7A, the input parameters include: hours associated with a phase (Khrs), Integrated System Test (IST) at High, IST at Medium, IST at Low, User Acceptance Test (UAT) at High, UAT at Medium, UAT at Low, Turn Around Hours (TAH) at High, TAH at Medium, TAH at Low, and Retest Time(RT) at High number. The input parameters shown are for exemplary purposes, and the invention is not intended to be limited to the input parameters shown.

FIG. 7A depicts the user interface 700 in an initial configuration presented to a user after the calculation of actual metrics according to the method of FIG. 5. In the example shown in FIG. 7A, calculated metrics scores are depicted at 701 for metrics M1-M9 based on numeric values V1-V11 of input parameters P1-P11. Numeric values V1-V11 for respective parameters P1-P11 are depicted in display boxes represented at 703, and represent actual values from input data received by the server 402.

Figure 7B:
FIG. 7B shows the quality metrics interface of FIG. 7A showing forecasted metrics in accordance with aspects of the invention.

FIG. 7B depicts the quality metrics interface of FIG. 7A showing forecasted quality metrics in accordance with aspects of the invention. The user interface may be utilized in the environment of FIG. 4 and in accordance with method steps of FIG. 5.

In embodiments, the user interface 700 provides a tool by which users can determine/predict when metrics scores will fall within a predetermined acceptable numeric range. More specifically, the user interface 700 enables a user to adjust/change one or more input parameter values utilizes the interactive controls 702. The quality server 114 calculates changes to each of the quality metrics scores 701 based on the user-implemented changes to one or more parameter values V1-V11, in accordance with method steps of FIG. 5. In the example of FIG. 7B, a user adjusts respective input parameter values V2 (16) and V3 (8) of FIG. 7A to obtain the parameter values V2'(33) and V3' (40). Changes to the input parameter values for P2 and P3 lead to changes in multiple interdependent quality metrics scores 701. Comparing the initial bar graph of FIG. 7A to the resulting bar graph of FIG. 7B, it can be seen that changes to P2 and P3 result in quality metrics scores for M1, M2, M5 and M8 changing from scores which fall outside the predetermined acceptable numeric range, to scores which fall within the predetermined acceptable numeric range, as indicated by the color changes to the bar graphs. In implementations, the server 402 generates a display of forecasted quality metrics based on determined relationships identified through changes in parameters data and quality metrics over time.

In embodiments, the server 402 implements quality management procedures according to FIG. 5 for software development projects. Software development projects may be concerned with monitoring the following quality metrics: phase containment percentage/defect removal efficiency, defect density and turn-around time. Phase containment of errors means detecting and correcting the errors within a given phase of software development. For example, a design error should be detected and corrected within the design phase itself rather than detecting it in the coding phase. Defect removal efficiency gives a measure of a development team's ability to remove defects prior to release and is typically calculated as a ratio of defects resolved to total number of defects found. Defect density is the number of defects confirmed in a software module during a specific period of operation or development divided by the size of the software module. Turn-around time refers to the time interval from the time of submission of a process to the time of the completion of the process. The term defects as used herein refers to the deviation of the actual and expected results of a system or software application, or any deviation or irregularity from specifications in a product functional specification document.

With reference to step 500 of FIG. 5, in implementations, the server 402 defines phase containment percentage based on the following. For a particular phase "k", at a certain organization level "dim" over a time period "T", the phase containment percentage is measured by the following calculation: 100 multiplied by the ratio of (A) and (B)—where:

(A) is the number of common members between two sets of defects, one satisfying all of the "n" conditions denoted by "i" as a variable, and another set of defects that belongs to the specific measuring phase); and (B) is the number of common members between two sets of defects, one satisfying all of the "n" conditions denoted by "i" as a variable, and another set of defects that belongs to all of the allowed phases including the specific measuring phase. In aspects, the percentage of the defects in a measurement phase are compared to total number of defects of all the phases (including the measuring phase). In embodiments, all the input parameters and their considered values are applied equally on numerator and denominator using selected conditions.

In implementations, the server 402 defines TAT based on the following. Average TAT or a particular phase "k", at a certain organization level "dim" over a time period "T" is measured by the ratio of (C) and (D)—where: (C) is the sum total of turn-around time of a set of defects which belongs to a specific phase "k" at a certain organization level "dim" over a time period "T"; and (D) is the number of common members between two sets of defects, one satisfying all of the "n" conditions denoted by "i" as a variable, and another set of defects that belongs to all of the specific measuring phase. In aspects, a ratio of total turnaround time of all the valid defects and the total number of defects of all the input parameters and their considered values are applied equally on numerator and denominator using selected conditions.

In embodiments, the server 402 defines DD based on the following. DD is measured for a specific measurement phase "k" at a certain organization level "dim" over a time period "T" by the ratio of (E) and (F)—where: (E) is the number of common members between two sets of defects, one satisfying all of the "n" conditions denoted by "i" as a variable and another set of defects that belongs to the specific measuring phase; and (F) is the sum total of estimated efforts of projects in organizational specific measuring units, at a certain organization level "dim" over a time period "T". In aspects, the ratio of total number of defects in a particular phase and estimation of projects of a particular cluster of organizational construct is determined. In one example, a User Acceptance Test Defect Density (UAT DD) is the number of UAT defects in a specific software release in UAT phase, per unit effort approved estimation in that release period. All the input parameters and their considered values are applied equally on numerator and denominator using selected conditions.

In implementations, the server 402 utilizes a cognitive booster mechanism in the form of a mathematical control and optimization expression of multi-dimensional discount factor reinforcement algorithm for quality metrics. In aspects, the server 402 utilizes a booster algorithm comprising an optimization approach with reinforcement mechanism to reach a multi-dimensional goal for quality practice ahead of time. In implementations, the inter-relation between different metrics can be leveraged to give a 360 degree view of metrics relationships. Mathematically, the server 402 may identify sets of defects by applied conditions, and the set of defects can be expressed by inverse function of the measuring metrics. Similarly, in practical automation for a quality metrics of a particular phase, time period and organization level, the server 402 may backtrack all defects with allowed conditions.

In implementations, the cognitive metrics module utilizes deep learning network tools to obtain defect sets. In aspects, some defect sets will be common for changes in more than one quality metrics. Hence, the server 402 can determine a set of defects, which is an intersection of atomic sets of defects contributing different quality metrics, contributing to all of the quality metrics. In implementations, the server 402 builds a matrix (n by m) for all mutually exclusive atomic sets of defects (parameters contributing to certain metrics) versus sets of actions that can be taken on them (e.g., update, delete or control). In embodiments, an elemental value given to each cell of the matrix by the server 402 follows a reinforcement algorithm's reward multiplied by a discount factor. In embodiments, the reward factor is associated with how much an action impacts the change in the quality metrics, which can be negative or positive or even zero depending on the increment/decrement/unchanged state of the quality metrics and direction of change versus the threshold of the quality metrics. In aspects, the discount factor is associated with an importance of the contributors, and ranges from 0 to 1. In implementations, the cognitive metrics module 418 assigns and stores reward factor and discount factor values.

In embodiments, a goal of a first iteration of a matrix generated at step 510 of FIG. 5 is to find out a maximum payoff in this matrix so that the server 402 can find out which one or a more contributors (e.g., set of defects) and what exact action(s) (discretized from a continuous range) is/are the best to achieve a best possible quality metrics output. With the same set of actions and contributors another matrix can be prepared by the server 402 with different elemental values for a different quality metrics. In aspects, the server 402 adds a number of quality metrics one after another with the same universally created sample space of actions and contributors, resulting in a third dimension of the payoff matrix-turned-tensor of the reinforcement algorithm with an objective that maximum payoff elements will form a set of numbers (or a set of sets if a set is chosen from each matrix) and the server 402 chooses the maximum to find the best combination of action over contributor to all of the quality metrics of an organization. In a next iteration, if the server 402 determines that the desired level of quality is not reached, the same algorithm can be applied with the last result of MaxiMax eliminated from the lot, and this can go on until the server 402 determines that the desired level is reached, and in the process the server 402 can find the set of contributors and corresponding actions on them to improve quality metrics. In implementations, all the contributors (i.e. number of defects with specific set of conditions) are the result of predictions (from previous iterations of the proactive quality prediction algorithm) in order to bear a meaningful premonition project management on specific action and contributor parameters. Furthermore, in a complex model, fourth or higher dimension of tensor can be created if the server 402 considers organization level or cluster level, release period, etc., separately. In implementations, for N dimensions, pay-off calculation and MaxiMax search of pay-off is done N–1 times to achieve optimized result of quality metrics at each iteration.

In embodiments, the server 402 generates a matrix of cells including a mutually exclusive atomic set of quality failure events contributing to a certain metrics versus actions associated with the mutually exclusive atomic set of quality failure events; assigns values to each cell of the matrix based on one or more bias factors including a reward factor indicating how much an action impacts a change in the metrics and a discount factor indicating an importance of the parameters; and generates an optimized range of quality metrics using a MaxiMax calculation for a predicted set of failure events. In aspects the predicted set of failure events are determined based on the predicted output values not meeting predetermined quality control threshold values.

Exemplary Optimization Algorithm

In embodiments, the server 402 implements steps of FIG. 5 utilizing an optimization algorithm. In embodiments, the server 402 utilizes an optimization algorithm to find a range for a set of input parameters which are directly or inversely proportional to different quality metrics. In implementations, the optimization algorithm expresses, in mathematical terminologies, the best way to find optimized values for proactive quality management. The following optimization algorithm sets forth step by step computation of those ranges of optimized values over set or predicted values of organization-specific impacting parameters and metrics, and to provide meaningful and foresighted balanced results.

Phase Containment % $\stackrel{m}{=}$ $$\varphi_{k,dim,T} = \left( \frac{n\left(\left\{\bigcap D_i\right\} \cap D_{C(k)}\right)_{dim,T}}{n\left(\left[\begin{array}{c}\left\{\left\{\bigcap D_i\right\} \cap D_{C(k)}\right\} \cup \\ \left\{\left\{\bigcap D_i\right\} \cap D_{C(k^C)}\right\}\end{array}\right]_{dim,T}\right)} \right) \times 100$$

Defect Density $\stackrel{m}{=} \rho_{k,dim,T} = \left( \dfrac{n\left(\left\{\bigcap D_i\right\} \cap D_{C(k)}\right)_{dim,T}}{\sum_p (\varepsilon_p)_{dim,T}} \right)$ TurnAround Time $\stackrel{m}{=} t_{Sev,dim,T} = \left( \dfrac{\sum_j (\tau_j)_{Sev,dim,T}}{n\left(\left\{\bigcap D_i\right\}\right)_{Sev,dim,T}} \right)$ $\forall C_i \exists$n-ary Tree($\bigcap_i D_i$) where ($\bigcap_i D_i$) is divided in n mutually exclusive sets which can be written as a new set:

$$\left(\bigcap_i D_i\right) \equiv \left\{\bigcup_{j=1}^n A_j\right\},$$

where $A_j$ are atomic mutually exclusive sets with a set of conditions.

In one example: PC has j1 sets, TAT has j2 sets and DD has j3 sets.

$\varphi_{k,dim,T} = f_1(\{\cup_{j=1}^n A_{j1}\}) \to \{\cup_{j1=1}^n A_{j1}\} = f_1^{-1}(\varphi_{k,dim,T})$
$\Rightarrow A_{j1} = f_{1j}^{-1}(\varphi_{k,dim,T}) \forall j1.$ $t_{Sev,dim,T} = f_2(\{\cup_{j2=1}^n A_{j2}\}) \to \{\cup_{j2=1}^n A_{j2}\} = f_2^{-1}(t_{Sev,dim,T}) \Rightarrow A_{j2} = f_{2j}^{-1}(t_{Sev,dim,T}) \forall j2.$ $\rho_{k,dim,T} = f_3(\{\cup_{j3=1}^n A_{j3}\}) \to \{\cup_{j3=1}^n A_{j3}\} = f_3^{-1}(\rho_{k,dim,T}) \Rightarrow A_{j3} = f_{3j}^{-1}(\rho_{k,dim,T}) \forall j3.$ Also, $\exists$ some $A_r \in A_{j1}, A_{j2}, A_{j3})$ when $A_r = f_{123}^{-1}(\varphi_{k,dim,T}, t_{Sev,dim,T}, \rho_{k,dim,T})$.

In one example, an optimization goal for better PC is:

$$\text{Range of } \varphi_{k,dim,T}^* = \left( \frac{\min\left(n\left(\left\{\bigcap D_i\right\} \cap D_{C(k)}\right)_{dim,T}\right)}{\max\left(n\left(\left[\begin{array}{c}\left\{\bigcap D_i\right\} \cap \\ \left\{D_{C(k)} \cup \left\{D_{C(k^C)}\right\}\right\}\end{array}\right]_{dim,T}\right)\right)} \right) \times 100 \text{ for}$$

$k$ = User Acceptance Test (UAT).

$$\text{Range of } \varphi_{k,dim,T}^* = \left( \frac{\max\left(n\left(\left\{\bigcap D_i\right\} \cap D_{C(k)}\right)_{dim,T}\right)}{\min\left(n\left(\left[\begin{array}{c}\left\{\bigcap D_i\right\} \cap \\ \left\{D_{C(k)} \cup \left\{D_{C(k^C)}\right\}\right\}\end{array}\right]_{dim,T}\right)\right)} \right) \times 100 \text{ for}$$

$k$ = System Test (ST).

Similarly, for $t_{Sev,dim,T}$ and $\rho_{k,dim,T}$ the server 402 can find the range of $t_{Sev,dim,T}^*$ and range of $\rho_{k,dim,T}^*$.

For overall better quality, optimization problem is to find a range of $A_r \forall r$ from the following fact:

$A_r^* =$ $f_{123}^{-1}(\varphi_{k,dim,T}^*, t_{Sev,dim,T}^*, \rho_{k,dim,T}^*) = f_{123}^{-1}(\min(\varphi_{k,dim,T}^*), t_{Sev,dim,T}^*, \rho_{k,dim,T}^*)$ for $k$ = UAT = $f_{123}^{-1}(\max(\varphi_{k,dim,T}^*), t_{Sev,dim,T}^*, \rho_{k,dim,T}^*)$ for = ST, PreProduction (for Defect Removal Efficiecny (DRE)).

Hence, optimum value of $A_r$ i.e. $A_r^*$ can be found when metrics values approach ideal values:

$\varphi_{k, dim, T} \to 100$ for k=ST or Pre–Prod (for DRE)
$\varphi_{k, dim, T} \to 0$ for k=UAT
$t_{Sev,dim,T}^* \to 0$ and
$\rho_{k,dim,T} \to 0$ $A_r$: Vectorized Contributors to m metrics.
$\alpha_i$: Discretized Set of Actions on $A_r$.
$Y_m \in [0,1]$: Weight to the booster factor for each quality metrics.

This will be 0 for the case when the specific action $\alpha_i$ for a $A_r$ when the metrics crosses the organization set threshold $\bar{r} \in \bar{\mu} \times \bar{\alpha}$, where $\bar{\mu}$ vector of contributors $A_r$ to m –th metrics, $\bar{\alpha}$ is vector of actions and $\bar{r}$ is vector of booster factor.

A matrix of dimension n by r will give a complete picture of how much $$\theta_i = \begin{array}{cccc} & A_{11} & A_{12} & \ldots & A_{1r} \\ \alpha_1 & r_{111}\gamma_{111} & r_{112}\gamma_{112} & \ldots & r_{11r}\gamma_{11r} \\ \alpha_2 & r_{121}\gamma_{121} & r_{122}\gamma_{122} & \ldots & r_{12r}\gamma_{12r} \\ \vdots & \vdots & \vdots & \vdots & \vdots \\ \alpha_n & r_{1n1}\gamma_{1n1} & r_{1n2}\gamma_{1n2} & \ldots & r_{1nr}\gamma_{1nr} \end{array}$$

For m different metrics a tensor will be formed.
For all metrics m:
Using MaxiMax optimizer, $$R_m = \max_n \left( \max_r r_{mnr} \gamma_{mnr} \right)$$

Goal:

$$\max_m R_m$$

A range can be checked relaxing the discretized actions for max in a row/column. Notations use:
(1) D∃Defects (Identified by Defect IDs) with a conditions $C_i \forall i=1, 2, 3 \ldots 9$.
(2) k ∈ {Unit Test, Integration–Component Test, System Test (ST), Integrated System Test(IST), Functional Test, Regression Test, Sanity, Iteration, Test, Agile, SAFe Specific, User Acceptance Test (UAT), End 2 End Test (E2E), Release—Deployment Test, User Certification Test, Production Test}

I. $X_{phase}=ST \rightarrow C(k) \overset{\rightarrow}{D}$ (Test Phase=ST)OR(Test Phase Similar to ST)OR(Test Phase∈[Phase($X'_{phase}$)])→(Test SubPhase $X_{subphase}$) where $X_{subphase}${Technology Specific Test phases (mS), Data, Security Test, Performance–Load Test, Usability Test, Accessibility Test, Non Functional Test, Automation Test, Configuration Test, Build Test, Tool specific Test, Environment Test, Organization (Org) Specific Descriptive Phases}

II. $X_{phase}=UAT \rightarrow C(k) \overset{\rightarrow}{D}$ (Test Phase=UAT)OR(Test Phase=Similar to UAT)OR(Test Phase∈[Phase($X'_{phase}$)]→ (Test SubPhase=$X_{subphase}$) where $X_{subphase}$∈{Technology Specific Test phases (mS), Data, Security Test, Performance–Load Test, Usability Test, Accessibility Test, Non Functional Test, Automation Test, Configuration Test, Build Test, Tool specific Test, Environment Test, Org Specific Descriptive Phases}

III. $X_{phase}$=Production Test →$C(k) \overset{\rightarrow}{D}$ (Test Phase=Production Test)OR(Test Phase=Similar to Production Test)OR(Test Phase∈[Phase($X'_{phase}$)]→(Test SubPhase=$X_{subphase}$) where $X_{subphase}$∈{Technology Specific Test phases (mS), Data, Security Test, Performance–Load Test, Usability Test, Accessibility Test, Non Functional Test, Automation Test, Configuration Test, Build Test, Tool specific Test, Environment Test, Org Specific Descriptive Phases}

IV. For Defect Removal Efficiecny: $X_{phase}$={ST, UAT}→$C(k) \overset{\rightarrow}{D}$ (Test Phase=ST/UAT)OR(Test Phase=Similar to ST/UAT)OR(Test Phase∈[Phase($X'_{phase}$)] →(Test SubPhase=$X_{subphase}$) where $X_{subphase}$∈{Technology Specific Test phases (mS), Data, Security Test, Performance–Load Test, Usability Test, Accessibility Test, Non Functional Test, Automation Test, Configuration Test, Build Test, Tool specific Test, Environment Test, Org Specific Descriptive Phases}

$k^c$ is complement set of phases of phase k.

dim∈{Individual System, Domain wise System cluster, All Systems}.

T∈{"Daily", "Weekly", "Monthly", "Bi-Monthly", "Quarterly", "Half Yearly", "Annually"}.

$\varepsilon_p$={Estimation of projects in person–hours} where p∈{List of project numbers} refer $C_6$.

Sev∈{High, Medium, Low, Sev1, Sev2, Sev3, P1, P2, P3, Test Case Blocker, Release Project Blocker, Org Specific}.

$\tau_j$={Total Turnaround hours} where j∈{∩$_i$ $D_i$} refer denominator of the formula.

More Dimensions like Sev, dim, T can be added as per Orgnization Standards.

$X_i$ is user supplied set of inputs for corresponding Condition $C_i \forall i$={$C_1, C_2, C_3, \ldots C_{10}$}.

$\forall i$ {$C_1, C_2, C_3, \ldots C_9$}.

I. $C_1 \overset{\rightarrow}{D}$ Defect Status=$X_1$
where $X_1$∈{New, Open, Fix in progress, Fixed, Delivered, Retest, Retest Complete, Retest Blocked, Retest Failed, Closed, Rejected, Cancelled, Deferred, Workaround, Org Specific}.

II. $C_2 \overset{\rightarrow}{D}$ Root Cause Category=$X_2$
where $X_2$∈{Requirements, Design, Coding, Data, Deployment, Duplicate, Environment, Testing, User, Training, Unassigned, Hardware, Space, Other, Not Known, Not a Defect, Org Specific}.

III. $C_3 \overset{\rightarrow}{D}$ (Root Cause Category==$X'_2$)→Root Cause Description=$X_3$.
where $X_3$∈{Software, Hardware, DB design. Software Version, Org Specific} and $X'_2$ {Requirements, Design, Coding, Data, Deployment, Duplicate, Environment, Testing, User, Training, Unassigned, Hardware, Space, Other, Not Known, Not a Defect, Org Specific}

IV. $C_4 \overset{\rightarrow}{D}$ Defect Severity & Blocker Priority=$X_4$
where $X_4${High, Medium, Low, Sev1, Sev2, Sev3, P1, P2, P3, Test Case Blocker, Release Project Blocker, Org Specific}.

$C_5 \overset{\rightarrow}{D}$ Defect Category=$X_5$.
where $X_5$∈{Valid Defect, Not a Defect, Test, Org Specific}.

VI. $C_6 \overset{\rightarrow}{D}$ Project Numbers=$X_6$.
where $X_6$∈{List of project numbers}.

VII. $C_7 \overset{\rightarrow}{D}$ Program names=$X_7$.
where $X_7$∈{List of program names}.

VIII. $C_8 \overset{\rightarrow}{D}$ Defect Date=$X_8$.
where $X_8$∈{f(T)OROrg specific date ranges}.

IX. $C_9 \overset{\rightarrow}{D}$ Source name=$X_9$.
where $X_9$∈{Database 1,Database 2}.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In some embodiments, a system and method is provided for dynamically capturing quality input parameters for organizational metrics by finding optimized ranges of parameters which are directed or inversely proportional to different metrics. In implementations, a computer-implemented method comprises: providing an initial set of metrics that match performance of a system by learning bias from performance data using a neural network, wherein the neural network is reconfigurable based on inputs that are obtained from a multi-dimensional vector (tensor); finding a range of values for the set of metrics that drive an optimal performance to meet system goals; predicting new ranges of values to enable changes to be made to optimize the system when a user manipulates multiple filters (levers) that internally compute bias impacts on individual units in hidden layers to drive re-computation of the output which in turn drive decisions and change influencing factors; and computing ranges of optimized values over set or predicted values of organization-specific impacting parameters and metrics which gives meaningful and foresighted balanced result for proactive quality management.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   training, by a computing device, an artificial network with data sets of historic quality failure events, wherein the artificial network is configured to predict a change in plural quality metrics based on changes in the value of input parameters utilized in calculating the plural quality metrics;
   receiving, by the computing device, input parameter data from one or more data sources for selected input parameters utilized in calculating the quality metrics, wherein the selected input parameters are associated with one or more processes;
   generating, by the computing device, output values for the plural quality metrics based on the input parameter data;
   providing, by the computing device, a user interface to a user including interactive controls enabling the user to selectively adjust numeric values of the selected input parameters;
   receiving, by the computing device, user-selected values for at least one of the selected parameters via the interactive controls of the user interface;
   generating, by the computing device using the artificial network, predicted output values for the plural quality metrics based on the user-selected values and determined relationships between the plural quality metrics and the selected input parameters;
   determining, by the computing device, compliance or non-compliance of the predicted output values for the plural quality metrics with stored expected values; and
   presenting, by the computing device, the predicted output values to the user via the user interface with indicia indicating the compliance or the non-compliance of the predicted output values for the plural quality metrics with stored expected values.

2. The computer-implemented method of claim 1, further comprising:
   determining, by the computing device using the artificial network, relationships between the plural quality metrics and the input parameters by:
      generating a matrix of cells including a mutually exclusive atomic set of quality failure events contributing to a certain metrics versus actions associated with the mutually exclusive atomic set of quality failure events;
      assigning values to each cell of the matrix based on one or more bias factors including a reward factor indicating how much an action impacts a change in the metrics and a discount factor indicating an importance of the parameters; and
      generating an optimized range of quality metrics using a MaxiMax calculation for a predicted set of failure events.

3. The computer-implemented method of claim 1, further comprising receiving, by the computing device, rules from the user defining the input parameter data to be utilized to generate the output values for the plural quality metrics.

4. The computer-implemented method of claim 3, further comprising:
   identifying, by the computing device, the one or more data sources of the input parameter data based on the rules; and
   mapping, by the computing device, the selected input parameters to the one or more data sources.

5. The computer-implemented method of claim 1, wherein a service provider performs at least one selected from the group consisting of: creates the computing device, maintains the computing device, deploys the computing device, and supports the computing device.

6. The computer-implemented method of claim 1, wherein the generating the predicted output values for the plural quality metrics based on the input parameter data is provided by a service provider on a subscription, advertising, and/or fee basis.

7. The computer-implemented method of claim 1, wherein the computing device includes software provided as a service in a cloud environment.

8. A computer program product comprising one or more computer readable storage media and program instructions collectively stored on the one or more computer readable storage media, the program instructions executable by a computing device to cause the computing device to:
   train an artificial network with data sets of historic quality failure events, wherein the artificial network is configured to predict a change in plural quality metrics based on changes in the value of input parameters utilized in calculating the plural quality metrics;
   receive input parameter data from one or more data sources for select input parameters utilized in calculating the plural quality metrics;
   receive user-selected values for at least one of the select input parameters via a user interface; and
   generate, using the artificial network, predicted output values for plural quality metrics based on the user-selected values, the input parameter data and relationships between the plural quality metrics.

9. The computer program product of claim 8, wherein the program instructions further cause the computing device to receive rules from the user defining the input parameter data to be utilized to generate the output values-for the plural quality metrics.

10. The computer program product of claim 9, wherein the program instructions further cause the computing device to:
   identify the one or more data sources of the input parameter data based on the rules; and
   map the at least one of the select input parameter to the one or more data sources.

11. The computer program product of claim 8, wherein the program instructions further cause the computing device to:
   determine, using the artificial network, relationships between the plural quality metrics and the input parameters by:
      generating a matrix of cells including a mutually exclusive atomic set of quality failure events contributing to a certain metrics versus actions associated with the mutually exclusive atomic set of quality failure events;
      assigning values to each cell of the matrix based on one or more bias factors including a reward factor indicating how much an action impacts a change in the metrics and a discount factor indicating an importance of the parameters; and generating an optimized range of quality metrics using a MaxiMax calculation for a predicted set of failure events.

12. A system comprising:

a processor, a computer readable memory, one or more computer readable storage media, and program instructions collectively stored on the one or more computer readable storage media, the program instructions executable to:

train an artificial network with data sets of historic quality failure events, wherein the artificial network is configured to predict a change in plural quality metrics based on changes in the value of input parameters utilized in calculating the plural quality metrics, wherein the training includes determining, using the artificial network, relationships between the plural quality metrics and the input parameters by:

generating a matrix of cells including a mutually exclusive atomic set of quality failure events contributing to certain metrics, versus actions associated with the mutually exclusive atomic set of quality failure events; and assigning values to each cell of the matrix of cells;

receive user-selected values from a user for at least one selected input parameter via interactive controls of a user interface;

receive input parameter data from one or more data sources based on the at least one selected input parameter; and generate, using the artificial network, predicted output values for the plural quality metrics based on the user-selected values and the input parameter data.

13. The system of claim 12, wherein the program instructions are further executable to receive rules from the user defining the input parameter data to be utilized to generate the plural quality metrics.

14. The system of claim 13, wherein the program instructions are further executable to:

identify the one or more data sources of the input parameter data based on the rules; and map the at least one selected input parameter to the one or more data sources.

15. The computer-implemented method of claim 1, wherein indicia indicating the compliance or the non-compliance of the predicted output values for the plural quality metrics comprises color codes indicating one of compliance and non-compliance of the predicted output values of the plurality of metrics.

16. The computer-implemented method of claim 1, wherein the plural quality metrics include phase containment percentage/defect removal efficiency, defect density, and turn-around time of a software development life cycle.

17. The computer program product of claim 8, wherein the program instructions are further executable to cause the computing device to:

provide the user interface to the user including the interactive controls enabling the user to selectively adjust numeric values of the at least one select input parameters;

determine compliance or non-compliance of the predicted output values for the plural quality metrics with stored expected values; and present the predicted output values to the user via the user interface with indicia indicating the compliance or the non-compliance of the predicted output values for the plural quality metrics with stored expected values.

18. The computer program product of claim 8, wherein indicia indicating the compliance or the non-compliance of the predicted output values for the plural quality metrics comprises color codes indicating one of compliance and non-compliance of the predicted output values of the plurality of metrics.

19. The system of claim 12, wherein the program instructions further cause the computing device to:

provide a user interface to a user including the interactive controls enabling the user to selectively adjust numeric values of the at least one selected input parameter;

determine compliance or non-compliance of the predicted output values for the plural quality metrics with stored expected values; and present the predicted output values to the user via the user interface with indicia indicating the compliance or the non-compliance of the predicted output values for the plural quality metrics with stored expected values.

20. The system of claim 12, wherein the program instructions further cause the computing device to:

wherein the assigning the values to each cell of the matrix is based on one or more bias factors including a reward factor indicating how much an action impacts a change in the metrics and a discount factor indicating an importance of the parameters; and the determining the relationships between the plural quality metrics and the input parameters further comprises generating an optimized range of quality metrics using a MaxiMax calculation for a predicted set of failure events.

* * * * *